Patented Mar. 27, 1923.

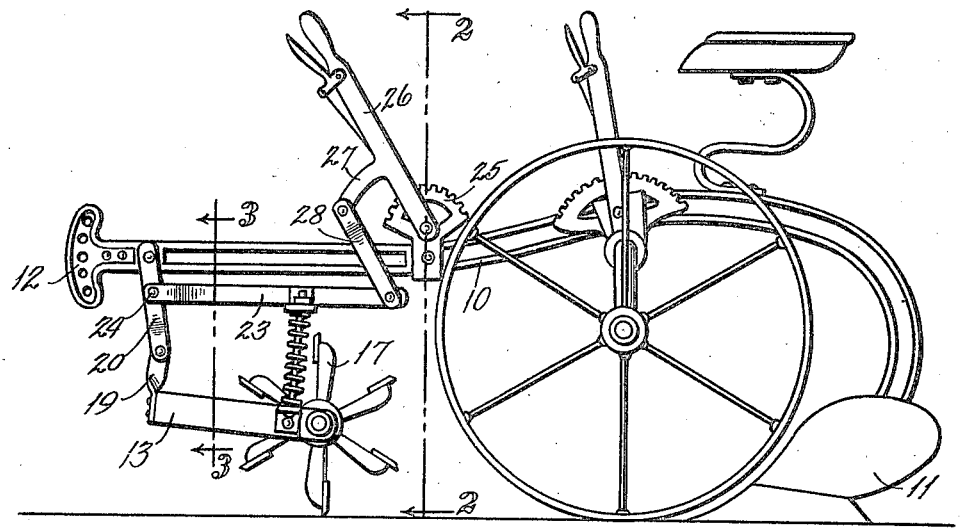
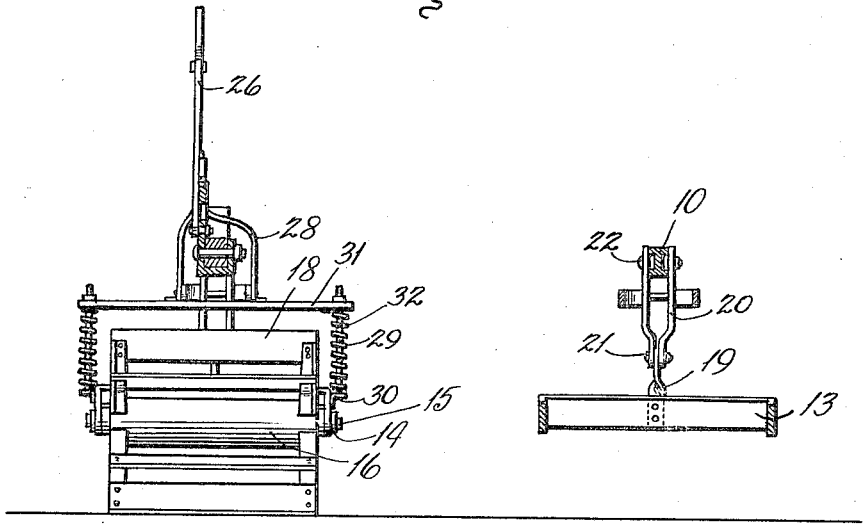

1,449,494

UNITED STATES PATENT OFFICE.

EDWIN M. CARLSON, OF MANOR, TEXAS.

STALK-CUTTER ATTACHMENT.

Application filed May 4, 1922. Serial No. 558,334.

*To all whom it may concern:*

Be it known that I, EDWIN M. CARLSON, a citizen of the United States, residing at Manor, in the county of Travis and State of Texas, have invented certain new and useful Improvements in Stalk-Cutter Attachments, of which the following is a specification.

This invention relates to new and useful improvements in stalk cutter attachments.

The object of the invention is to provide a stalk cutter which may be attached to the beam in front of a plow to cut the stalks at the same time the plowing is carried out. This enables the stalks to be turned under at the same time the soil is plowed if desired. By attaching the stalk cutter to the plow an extra operation is saved.

An important object of the invention is an improved construction which includes means for raising and lowering the stalk cutter while the same is in operation without stopping the team. A further feature resides in compression springs arranged at each side to take the upward thrust of the cutter so that the same will not be communicated to the plow and interfere with the operation thereof.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a riding plow equipped with a stalk cutter attachment constructed in accordance with my invention, Fig. 2 is a transverse vertical sectional view on the line 2—2 of Fig. 1, and Fig. 3 is a vertical sectional view on the line 3—3 of Fig. 1.

In the drawings the numeral 10 designates the beam of a riding plow or other implement, said beam carrying a plow shovel 11, and being equipped at its front end with a clevis 12, for the attachment of draft devices. An ordinary riding plow is illustrated, in view of which a detailed description of the structure thereof is deemed unnecessary.

The stalk cutter attachment includes a yoke 13, having its ends directed rearwardly and provided with suitable bearing boxes 14, for receiving the axle 15 of a cutter member, the latter comprising a hub 16 having radially directed arms 17 at each end. Transverse cutting blades 18 have their ends suitably secured to the ends of the arms and project beyond the same so as to present the entire cutting edges of said blades.

A twisted link 19 is fastened to the front side of the center of the yoke and has its upper end pivoted in the lower end of a hanger 20 upon a bolt 21 passing thru the parts, the lower end of the hanger being contracted to snugly receive the link. In this manner the link is pivoted in the hanger. The upper end of the hanger straddles the beam 10 just in rear of the clevis 12, and is pivoted on a transverse bolt 22. A pair of links 23 have their forward end contracted and pivoted to the sides of the hanger at 24, which is intermediate the ends of the latter. The beam 10 is disposed centrally of the links 23 and the latter extends rearwardly under said beam.

A locking segment 25 is suitably bolted or otherwise fastened on the beam just in front of the wheels of the plow, and has a lever 26 concentrically pivoted thereon, said lever being provided with the usual locking plunger for engaging the segment and holding said lever in position. Slightly above the segment the lever 26 is provided with a forwardly directed and downwardly curved arm 27. A pair of straps 28 straddling the beam 10 have their upper ends contracted and pivoted to the forward end of the arm 27, while their lower ends are pivoted to the rear ends of the links 23.

For holding the cutter in engagement with the ground and also permitting it to yield upwardly, I provide spring devices consisting of a rod 29 having its lower end attached to a bracket 30, one of said rods being mounted on each side of the yoke immediately in front of the boxes 14. The upper ends of the rods pass thru a transverse keeper bar 31 fastened to the undersides of the links 23. On each rod a coiled spring 32 is confined between the part 30 and the bar 31, sufficient play being allowed for the swinging of the rods when the cutter is moved vertically. It will be seen that the yoke is pivotally suspended by the links 19 from the hanger 20, and the yoke together with the cutter may swing upwardly against the tension of the springs 32, thus passing over obstructions without affecting the running of the shovel 11.

The adjustment lever 26 is very important. It will be seen that by pulling the lever 26 forwardly the arm 27 will swing the links 23 upwardly whereby the yoke 13 and the cutter will be raised, the pivotal connections of the links 19 and hanger 20 permitting this movement. By this means the stalk cutter may be vertically adjusted without stopping the team and may be raised over an obstruction if desired or set at the proper height. This is a very important and useful feature particularly in transporting the plow from place to place, or for elevating the cutter when it is not desired to use the same and permit the operation of the shovel 11 without interference. There are many other advantages which are obvious.

Various changes may be made and modifications and alterations carried out without departing from the spirit of the invention.

What I claim, is:

1. In a stalk cutter attachment for plows, the combination of a yoke, a stalk cutter member journaled in the yoke, means for pivotally suspending the forward end of the yoke from a plow beam, an adjusting lever adapted to be mounted on a plow beam, a connection between the adjusting lever and the suspending means, and resilient yieldable connections between the yoke and the connection extending from the lever to the suspending means.

2. In a stalk cutter attachment for plows, the combination of a yoke, a stalk cutter journaled in the yoke, a hanger adapted to be attached to the forward end of a plow and pivotally suspending the forward end of the yoke, links extending rearwardly from the hanger, spring connections extending from the rear ends of the yoke to the links, and an adjusting lever adapted to be mounted on the plow beam and having pivotal connection with the rear ends of the links.

3. In a stalk cutter attachment for plows, a yoke, a stalk cutter journaled in the rear end of the yoke, a hanger adapted to be pivoted to the forward end of a plow beam and having its lower end pivotally connected with the forward end of the yoke, a pair of links having their forward ends pivotally connected to the hanger, a keeper bar extending transversely of the yokes, spring connections between the rear ends of the yoke and the keeper bar, a locking segment adapted to be attached to a plow beam, an adjusting lever mounted on the segment and having an arm, and straps pivoted to the arm and having their lower ends pivoted to the rear ends of the links.

In testimony whereof I affix my signature.

EDWIN M. CARLSON.